United States Patent [19]

Russell

[11] 4,425,623

[45] Jan. 10, 1984

[54] LOOKAHEAD CARRY CIRCUIT APPARATUS

[75] Inventor: Jeffrey D. Russell, Cedar Rapids, Iowa

[73] Assignee: Rockwell International Corporation, El Segundo, Calif.

[21] Appl. No.: 283,304

[22] Filed: Jul. 14, 1981

[51] Int. Cl.³ .............................................. G06F 7/50
[52] U.S. Cl. .................................. 364/786; 364/787
[58] Field of Search ...................... 364/784, 786, 787

[56] References Cited

U.S. PATENT DOCUMENTS

| 3,717,755 | 2/1973 | Briley | 364/786 |
| 3,757,308 | 9/1973 | Fosdick | 364/786 X |
| 3,843,876 | 10/1974 | Fette et al. | 364/786 |
| 3,925,652 | 12/1975 | Miller | 364/787 |
| 3,993,891 | 11/1976 | Beck et al. | 364/787 |
| 4,357,675 | 11/1982 | Freyman | 364/786 |

Primary Examiner—Charles E. Atkinson
Attorney, Agent, or Firm—Bruce C. Lutz; Howard R. Greenberg; H. Fredrick Hamann

[57] ABSTRACT

Lookahead carry circuitry is provided for use with the consecutive bit stages of a digital adder whereby the computational throughput of an arithmetic logic unit can be increased (in other words reduced in time of operation). This is accomplished by reducing the number of gates required in the serial switching path to minimize the time delay for generation of carry output signals.

7 Claims, 7 Drawing Figures

LOOKAHEAD CARRY CIRCUIT APPARATUS

INVENTION

The present invention is generally related to electronics and more specifically related to computers. Even more specifically, it is related to a lookahead carry circuit for use with digital adders.

In the prior art, there are many types of carry circuits, the most popular of which is a ripple carry circuit for carrying forward the carry signal as each pair of data bits are logically added. Such a process is simple to implement but requires that each stage of computation be completed before the carry results are available to allow the next stage of addition to occur. As such, the computations are very slow and it is often desirable that these computations be carried out in a quicker manner.

For this reason, lookahead carry circuits were designed to be used with the individual stages of the digital adder whereby the circuitry looks at the signals to be added and determines whether or not a carry is appropriate without accomplishing the addition process. Thus, the carry is available for later circuitry as a type of advance prediction of what is going to happen. This technique is especially desirable in an adding device which uses a combination of ripple carry and lookahead carry to provide the entire logical operation function of addition or subtraction in a much smaller time frame than would be normally possible.

In accordance with the teachings of this invention, generate and propagate signals are produced from each individual bit stage of a digital adder to operate a plurality of gates which (1) generate a carry for a given stage, (2) propagate a carry from a previous stage or (3) block a carry from a previous stage depending upon the logic values of the bits to be added for that particular bit stage. In this manner, the carry signal is available substantially instantaneously after the logic signals to be added are established.

The general concept of lookahead carry circuits may be found in any of many publications such as a book entitled "Designing with TTL integrated circuits" prepared by Texas Instruments Incorporated and published by McGraw Hill Book Company, In this book, various types of lookahead carry circuits are illustrated from pages 235 to 239. In addition, Texas Instruments produces several standard lookahead carry circuits, one of which has part number SN 54182.

Thus, the combination of ripple carry and lookahead carry (sometimes designated carry-bypass) to provide the entire logical operation function for addition in a small time frame in itself is old. The prime objection to the prior art is the great number of components (especially AND gates) and leads required to provide the functions of generating, propagating and blocking of the carry signals.

The present invention utilizes positive logic supply lead, ground leads and carry leads to provide the various functions. In other words, the block function is obtained by grounding the carry lead at a given stage. The propagate function is provided by disconnecting the power supply lead and the ground lead from the carry lead and essentially passing the signals on these leads undisturbed from the previous stage to the next stage. The generate function is provided by opening the ground lead at that stage and connecting the power supply lead to the carry lead.

In view of the above, it is an object of the present invention to provide an improved design lookahead carry circuit and approach to designing same.

Other objects and advantages of the present invention may be ascertained from a reading of the specification and appended claims in conjunction with the drawings wherein:

DETAILED DESCRIPTION

Figure 1:
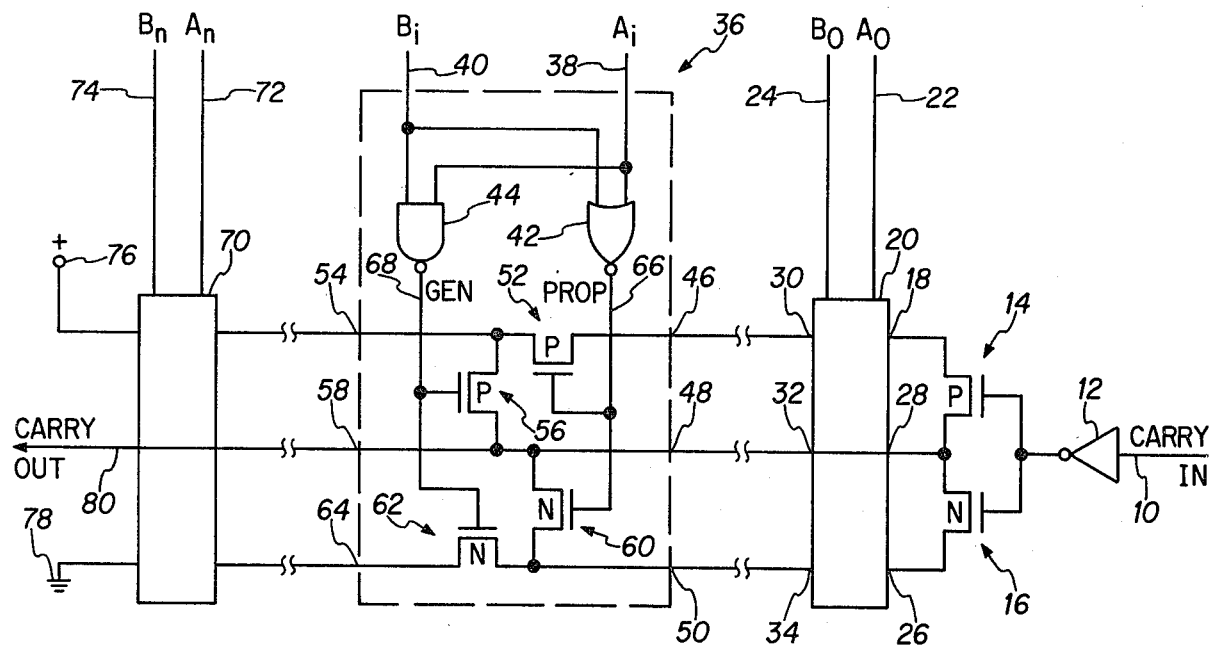
FIG. 1 is a schematic diagram of one embodiment of the inventive concept.

In FIG. 1 a carry in lead 10 supplies signals to an inverter 12 which supplies outputs to a pair of FET transistors of gating means generally designated as 14 and 16 with 14 being a P channel FET and 16 being an N channel FET. The source of P channel transistor 14 is connected to an input or terminal 18 of a block or stage 20 which represents the lookahead carry portion of bit stage zero in the word being operated upon. Block 20 also has input leads or terminals 22 and 24 which receive input signals $A_0$ (addend) and $B_0$ (augend) respectively. Block 20 also has an input or terminal 26 connected to the drain of N channel transistor 16 and an input or terminal 28 which receives the carry signals. Block 20 has output leads or terminals 30, 32 and 34 which represent the positive logic one, carry and ground leads respectively. These leads are broken to represent any number of additional stages between stage 20 and a further block or stage 36. Stage 36 has inputs 38 and 40 supplying signals $A_i$ and $B_i$ from the digital adder stage representing the Ith bit. Internal to block 36 the lead 38 is connected both to one input of a logical NOR gate 42 and to a logical NAND gate 44. The lead 40 is connected to supply $B_i$ signals to the same two gating means 42 and 44. Leads or terminals 46, 48 and 50 supply the plus (logic one), carry and ground signals respectively to block 36. A P channel FET transistor generally designated as 52 has its source connected to a lead or terminal 54 and its drain connected to lead 46. A P channel FET transistor generally designated as 56 has its source connected to a lead 54 and its drain connected to carry lead 58. An N channel FET transistor 60 has its source connected to lead 58 and its drain connected to lead 50. A final N channel transistor FET 62 has its source connected to lead 50 and its drain connected to a lead 64. The transistors 52, 56, 60 and 62 may also be designated as switching means, gating means, signal passing means and etc. for the purposes of defining the functions of these devices in the claims. The output of NOR gate 42 is provided on a lead 66 to the gates of each of the transistors 52 and 60 while an output 68 of NAND gate 44 supplies signals to the gates of transistors 56 and 62. There is a further break between leads 54, 58 and 64 and their corresponding connections to a final block or stage 70 of the lookahead carry circuit illustrated in FIG. 1. Block 70 has inputs $A_n$ and $B_n$ supplied on leads 72 and 74 respectively and receives the continuation of leads 54, 58, and 64 from block 36. This statement is made while realizing that there may be any number of additional stages between the first and last stages. The block 70 is connected to a positive power terminal 76 for receiving the logic one signals and is connected to ground 78 for receiving ground signals and finally provides an output lead 80 for carry out signals.

Figures 2, 3, 4:
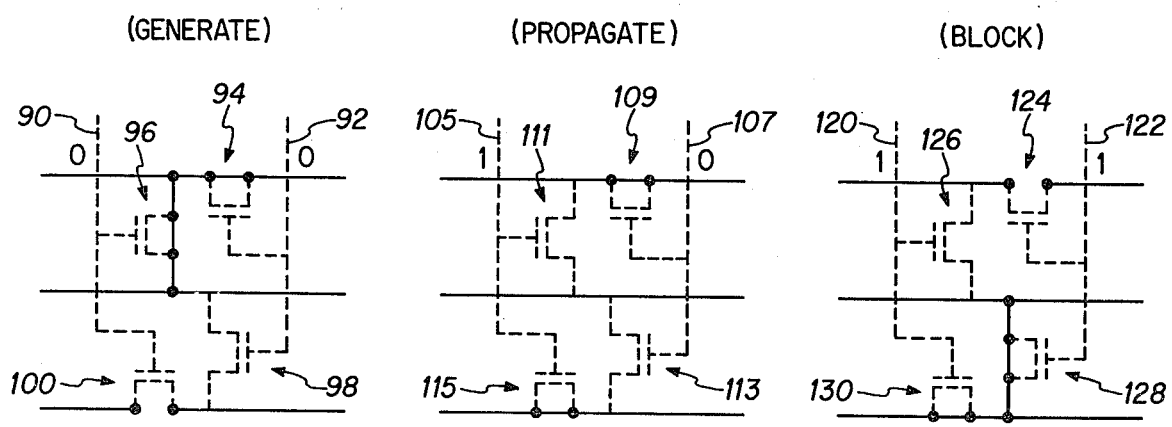
FIG. 2 is an explanatory figure used in describing the operation of FIG. 1.
FIG. 3 is a further figure used in describing the operation of FIG. 1.
FIG. 4 is final descriptive figure used in explaining the operation of FIG. 1.

In FIG. 2 a redrawing of block 36 of FIG. 1 in the "generate" mode is illustrated. Leads 90 and 92 represent, respectively, 68 and 66 in FIG. 1 with these connections being provided to gating means 94, 96, 98 and 100 representing transistors 52, 56, 60 and 62 respectively as illustrated in FIG. 1. As shown, the lead 92 is a logic zero and causes transistor 98 to be opened (OFF) and transistor 94 to be closed (ON) or provide signal passage therethrough. On the other hand, the logic zero on lead 90 opens transistor 100 and causes signal passage between the source and drain leads of transistor 96.

In FIG. 3 designations from 105 to 115 are provided as shown in a manner corresponding to that described in FIG. 2. As illustrated, a logic zero on lead 107 provides a propagate signal to turn OFF or open transistor 113 and turn ON or close transistor 109 while a logic one on generate signal lead 105 causes transistor 111 to remain open and transistor 115 to be an ON condition.

In FIG. 4 the number designation is provided again similar to that in FIG. 2 and FIG. 3 and represents corresponding positions in FIG. 1 wherein a logic one on the propagate lead 122 turns transistor 124 OFF and transistor 128 ON and a logic one on generate lead 120 turns transistor 126 OFF and transistor 130 ON.

Figure 5:
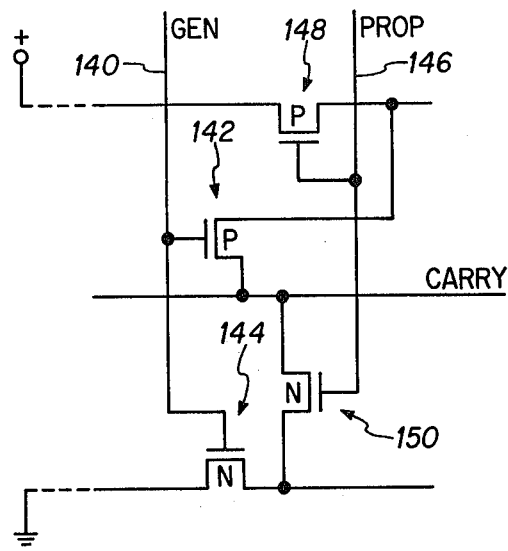
FIG. 5 and FIG. 6 illustrate alternate connections of the components used in FIG. 1 to illustrate the flexibility of component placement.

In FIG. 5 a generate lead 140 supplies inputs to a P channel FET 142 and to an N channel FET 144 while a propagate lead 146 supplies signals to the gates of a P channel FET 148 and N channel FET 150 all connected as shown between the positive lead, a carry lead and a ground lead in substantially the same manner as illustrated previously. The prime alteration between FIG. 5 and FIG. 1 is that the source lead of transistor 142 is connected to the opposite side of the transistor 148 as compared to that shown in FIG. 1 to illustrate that the point of connection does not affect the performance.

Figure 6:
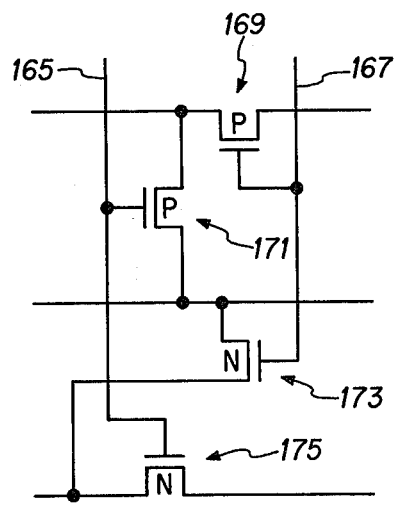

In FIG. 6 the connections of the N channel FETs 173 and 175 are interchanged while the P channel transistors 169 and 171 remain in the configuration illustrated in FIG. 1. Otherwise, the layout and connection and description of operation remains identical with that of FIG. 5 or previously described FIG. 1.

Figure 7:
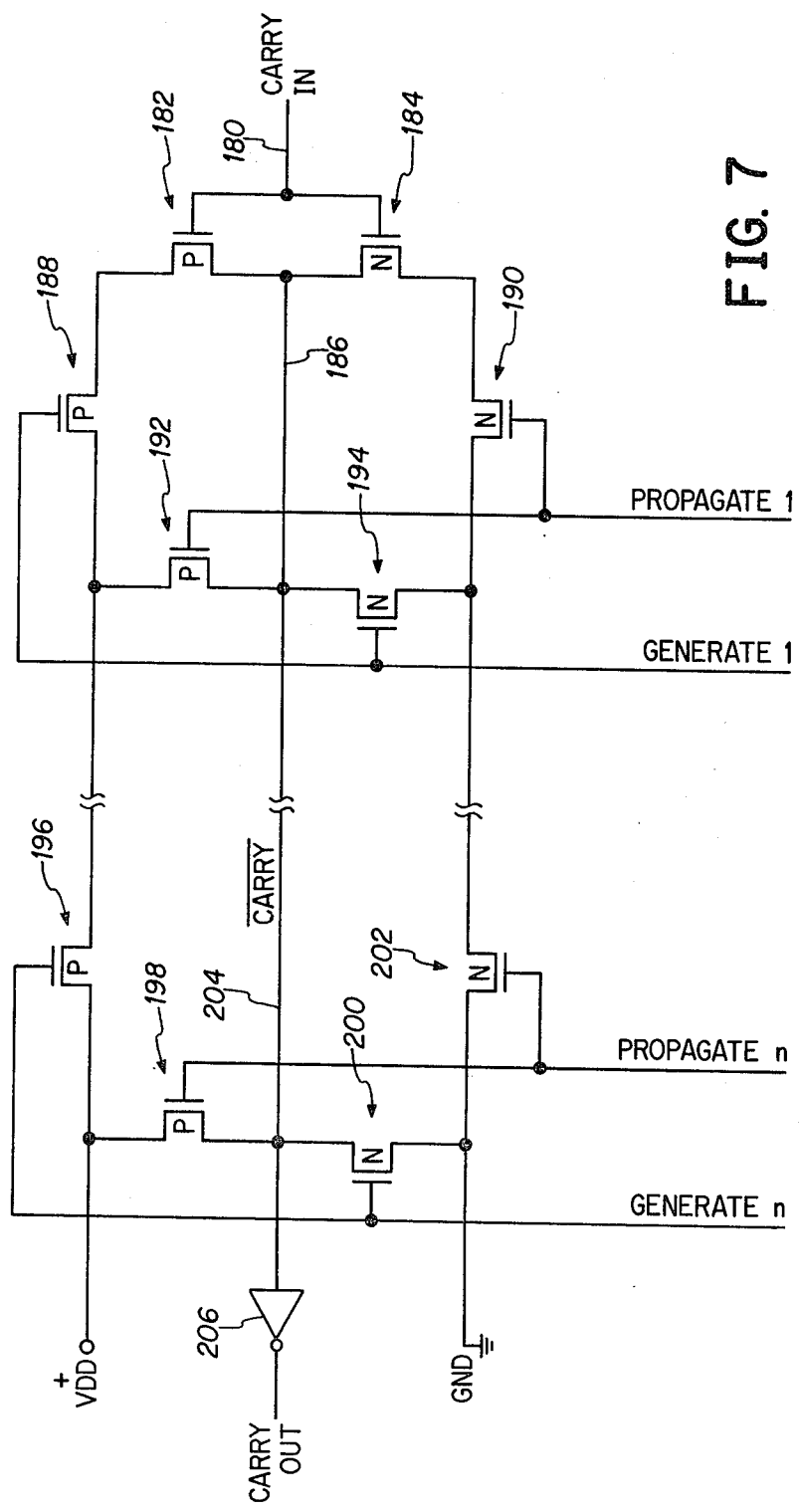
FIG. 7 is a further embodiment using referse logic to accomplish the functions of FIG. 1.

FIG. 7 is a negative logic configuration of the circuitry illustrated in FIG. 1 showing the first and the nth stages in detail rather than the Ith stage as illustrated in FIG. 1. In FIG. 7 a carry in signal is supplied on lead 180 to a P channel FET 182 and an N channel FET 184. Transistors 182 and 184 invert the carry in logic supplied on 180 to a $\overline{carry}$ signal on a lead 186. These transistors 182 and 184 are also connected to FETs 188 and 190 as illustrated. These two transistors receive the generate and propagate signals for stage 1 as illustrated and are also connected to further FETs 192 and 194. A break in the leads shows there may be additional stages between stages 1 and n. On the left hand side of FIG. 7 are further P and N channel transistors 196, 198, 200 and 202 as illustrated with the propagate signal being supplied to transistors 198 and 202 and the generate signal being supplied to transistors 200 and 196. The $\overline{carry}$ signal on lead 204 is supplied to an inverter 206 to again change the output to be the correct logic value as carried forward from the input or generated in one of the previous stages and propagated to or blocked from the inverter 206.

OPERATION

The basic idea of the present concept in adder circuits is to examine the input to a number of stages of the adder and, simultaneously, to generate the carries for each of these stages. These carry outputs are then applied to the appropriate adder stages which then produce the final SUM outputs. Thus, instead of the SUM outputs waiting for the carries to ripple through the circuits before settling to their final value, the correct carries and SUM outputs are available immediately. Theoretically, this approach could be adapted for all stages of the adder but in prior art design approaches, this practice would result in a prohibitively costly design, and for this reason carry lookahead is normally applied to a group of stages only Carry lookahead is normally appied between bits in a group; the number of bits (or stages) in a group depends on the circuit modules available and is usually limited by the fanning factor of the unit in the prior art. Five stages have commonly been accepted as a good engineering compromise. Thus, the simplest form of fast adder consists of carry lookahead within groups and ripple carry between groups. In such an adder, the first group (starting from the least significant) is called the zero level and generates the carry output which must apply to the next group (first level) as an input. Thus the first level must wait until the zero level has produced a carry output before it can produce an output itself for the second level, and so on. Consequently, all the carries and SUM outputs are produced in a time proportional to the number of levels multipled by the propagation delay of one carry lookahead adder stage.

The present invention approximates another prior art circuit using what is called a carry-bypass scheme. In this scheme the full adder is split into groups of standard ripple adder stages and each group has a single carry bypass circuit consisting of all the individual stage propagate terms. Thus, the carry generated by a lower order group that has to be passed to a higher order group has to pass through one level of logic circuits. The carry bypass scheme may also be used in conjunction with carry lookahead within the groups themselves. This technique is even closer to that used by the circuitry incorporating the present invention. In this case, both the carry propagate and carry generate terms are included in logic circuits for providing carry information to following groups. As well as bypassing the carry from the previous stages, the circuit also detects when all stages are generating a carry and if so a carry output is produced immediately and passed to the next stage using one stage of logic only.

While the prior art has some of the basic concepts utilized in the present invention, the number of transistors required to practice the concepts as taught by the prior art still exceeded the number of transistors presently used by a large value.

Referring to FIGS. 1, 2, 3 and 4, it will be noted that the A and B inputs are obtained from the digital adder circuits and supplied to each stage of the carry lookahead circuit. If in FIG. 1 the $A_i$ and $B_i$ inputs to stage 36 are logic zero, the summation of a logic one or a logic zero input on the carry would obviously not be passed. Thus, the situation of both A and B being a logic zero requires that the carry be blocked. The combination of logic zeros for the $A_i$ and $B_i$ inputs will provide logic ones on leads 66 and 68. Referring to FIG. 4, it will be noted that this will turn transistor 128 and 130 to an ON condition to thereby connect the carry input to ground or reference potential which is shown in FIG. 1 as lead 50. This will prevent the carry from being transmitted to the following stage such as 70.

If either $A_i$ or $B_i$ is a logic one, lead 66 will be a logic zero and lead 68 will be a logic one. This condition requires that whatever carry signal is input be propagated or transmitted to the following stage. In other words, if one of A and B is a logic one and the carry is a logic one, a carry would be generated in normal adding logic. However, if the carry input is a logic zero and either A or B is a logic one, there would be no carry. Thus, with logic zero on lead 66 and logic one on lead 68, transistors 109 and 115 are turned to an ON condition while the remaining transistors are left in an open condition and each of the leads passing through that stage of the carry lookahead circuit are left undisturbed and are not connected to each other. Thus, there is compliance with the logical conditions fulfilling a propagate situation.

If both $A_i$ and $B_i$ are a logic one, a carry signal should be generated regardless of whether or not a carry signal is input. In such a situation, both leads 66 and 68 are a logic zero thereby turning transistor 96 to a ON condition and transistor 94 to a ON condition. Thus, the carry lead 58 is connected to the logic one supply line and the supply line is also connected to the next previous stage.

The above information can be presented in any of many ways and may be summarized in a slightly different perspective by the following paragraphs:

In all of the three paragraphs infra, stage i, by definition is the first stage which is not in the propagate mode commencing with the most significant bit as the first stage and working towards the least significant bit. Of course, if all of the stages are in the propagate mode, the conditions outlined in the next paragraphs describe the lookahead carry circuit principle.

If all the stages of FIG. 1 are in the propagate configuration of FIG. 3, there is a "direct through" path for both the positive and ground potentials as provided by the FETs of each stage. FETs 14 and 16 of FIG. 1 thus act as an inverter, so that the carry output line 80 assumes the same state as the carry input line 10. This is in keeping with the teachings of the carry lookahead principle as outlined previously.

If stage i of FIG. 1 is in the generate configuration and all succeeding (more significant bit) stages are in the propagate configuration, a different situation is presented. The succeeding stages, in this situation, provide connection to the positive and ground potentials whereas the Ith stage (stage 36 as illustrated) completes a connection of the carry output line to the positive supply 76 and opens the connection of the ground line 64. Thus, the carry output line is asserted high (regardless of the carry logic value of previous stages) in keeping with the teachings of the carry lookahead principle.

Finally, stage i may be assumed to be in the block configuration and all succeeding stages are in the propagate configuration. The succeeding stages therefore, provide connection to the positive and ground potential whereas the Ith stage completes a connection of the carry output line to the ground supply 64 and opens a connection of the positive supply 54 since FET 56 is opened. Thus, the carry output line is asserted low in keeping with the teachings of the carry lookahead principle.

It is believed obvious that all possible configurations are encompassed by one of the above three described cases.

FIGS. 5 and 6 were included to illustrate that the transistor 56 and transistor 60 in FIG. 1 can be connected between the carry lead and the appropriate one of logic one and reference potential on either side of the transistors 52 and 62. Thus, it is believed unnecessary to comment further on these figures.

In FIG. 1 the carry input signal from any previous set of stages is inverted in inverter 12. The design of the input isolating switches 14 and 16 is such that the carry signal is again inverted as output to input 28 of stage 20. Thus, the carry signal is in its appropriate format throughout the carry lookahead circuit of FIG. 1.

In FIG. 7 the logical inverse of FIG. 1 is provided wherein the carry input signal is inverted by transistors 182 and 184 and then passed by the various stages in accordance with the preceeding described logic as a not carry or $\overline{\text{carry}}$ signal. When all the carry lookahead action is completed, this signal is returned to the appropriate logic level by inverter 206. The logic circuitry for producing the generate and propagate signals were not illustrated since such is believed obvious to one skilled in the art from the details of FIG. 1.

The above described method of carry lookahead generation may be expanded to perform the lookahead function over any number of adder bit stages. Additionally, any number of lookahead stages may be concatenated, each performing the lookahead function for a section of an adder, providing carry inputs to the next carry lookahead and its corresponding adder section as implied above.

The present invention, therefore relates to a completely different approach for reacting to the generate and propagate signals for manipulating the lookahead carry logic signals to be used by the adder circuit from that illustrated in the prior art and the accompanying reduction in components.

Since as illustrated by FIGS. 1 and 5 through 7, there are many different approaches to practicing the inventive concept, I wish to be limited not by the specific circuit shown but only by the scope of the appended claims, wherein

I claim:

1. Lookahead carry apparatus comprising, in combination:
    propagate signal supply means;
    generate signal supply means;
    signal power circuit supply means including first and second terminals;
    ground circuit terminal means including first and second terminals;
    carry signal terminal means;
    first gating means including control means connected between first and second terminals of said power supply means for connecting said first and second terminals to allow passage of signals in response to signals of a given logic value supplied to said control means thereof;
    second gating means including control means connected between said carry signal means and said first terminal means of said ground means for electrically connecting said carry signal terminal means and said first terminal means of said ground circuit terminal means in response to control signals of a value opposite said given logic value;

means connecting said propagate signal supply means to said control means of each of said first and second gating means;

third gating means including control means connected between said first terminal of said signal power circuit supply means and said carry terminal means for electrically connecting said first terminal means of said signal power circuit supply means and said carry signal terminal means in response to control signals received of said given logic value;

fourth gating means, including control means, connected between first and second terminal means of said ground circuit terminal means for electrically connecting said first and second terminals of said ground circuit terminal means together in response to control signals of a logic value opposite said further given logic value; and means connecting said generate signal supply means to said control means of each of said third and fourth gating means for supplying control signals thereto.

2. Lookahead carry circuit apparatus comprising, in combination:

a plurality of stages as claimed in claim 1;

means connecting first terminals of each of said signal power terminal circuit means and ground circuit terminal means to second terminals of corresponding power or ground circuit terminal means in adjoining stages;

means connecting said carry signal terminal means of adjoining stages together;

fifth gating means connected between a first terminal means and said carry signal terminal means for a first stage of said plurality of stages, said fifth gating means including control input means;

sixth gating means, including control input means, connected between said carry terminal means and said first terminal means of said ground circuit terminal means, said sixth gating means being actuated by control signals of an opposite polarity to that polarity affecting said fifth gating means; and means for supplying carry input signals to said control means of each of said fifth and sixth gating means.

3. Single bit stage lookahead carry apparatus comprising, in combination:

first and second means for supplying generate and propagate control signals respectively, the generate and propagate signals having the same logic values when received addend and augend have the same logic value and having opposite logic values when received addend and augent signals have opposite logic values;

multiple path switch means including control signal input means and switched signal passage means;

positive, carry and ground lead means each for series connection to adjacent stages; and means connecting said multiple path switch means to said first means, said second means and said positive, carry and ground lead means for (1) opening a connection of said positive lead to an adjacent stage and interconnecting said ground lead and said carry lead, (2) maintaining all lead characteristics or (3) opening a connection of said ground lead to an adjacent stage and interconnecting said carry lead and said positive lead respectively for blocking, propagating or generating carry signals in accordance with received control propagate and generate signals.

4. The method of providing lookahead carry in each stage of lookahead carry apparatus used with a binary digital adder where the logic one and reference potential lines are series connected between stages comprising the steps of:

blocking carry signals by opening logic one control lines passing through a stage from stage to stage and commonly connecting carry and reference potential lines;

generating carry signals by opening reference potential control lines passing through a stage from stage to stage and commonly connecting carry and logic one lines; and propagating carry signals by disconnecting the carry line from other control lines.

5. Apparatus for providing lookahead carry logic in each stage of lookahead carry apparatus where logic one and reference potential control lines are series connected through each of the stages comprising, in combination:

logic one control lines, reference potential control lines, and carry signal control lines;

means for blocking carry signals in a given stage, comprising means for opening logic one control lines in the stage and connecting said carry and reference potential control lines together;

means for generating carry signals, comprising means for opening reference potential control lines and means for connecting said carry and logic one lines together; and means for propagating carry signals, comprising means for disconnecting the carry line from said logic one and reference potential control lines.

6. Apparatus as claimed in claim 5 comprising, in addition:

means for receiving A and B control signals from a digital adder; and logic gating means for logically combining said A and B signals to produce propagate and generate control signals to be used by said means for blocking, said means for generating and said means for propagating whereby said connecting and disconnecting operations are initiated.

7. Apparatus as claimed in claim 5 comprising, in addition:

means for supplying propagate signals to said means for blocking, said means for generating and said means for propagating; and means for supplying generate signals to said means for blocking, said means for generating and said means for propagating.

* * * * *